April 27, 1965

R. S. JONES 3,180,443

VEHICLES

Filed May 14, 1962

INVENTOR
RICHARD STANTON JONES

BY *Larson and Taylor*

ATTORNEYS

April 27, 1965
R. S. JONES
3,180,443
VEHICLES
Filed May 14, 1962
2 Sheets-Sheet 2
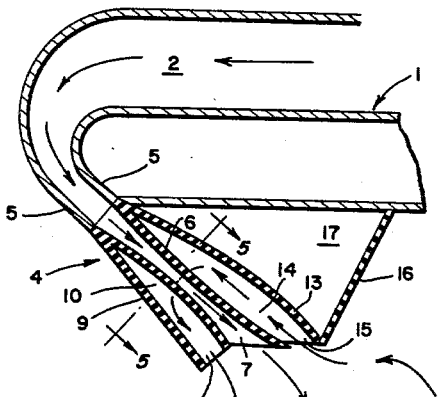
FIG. 4
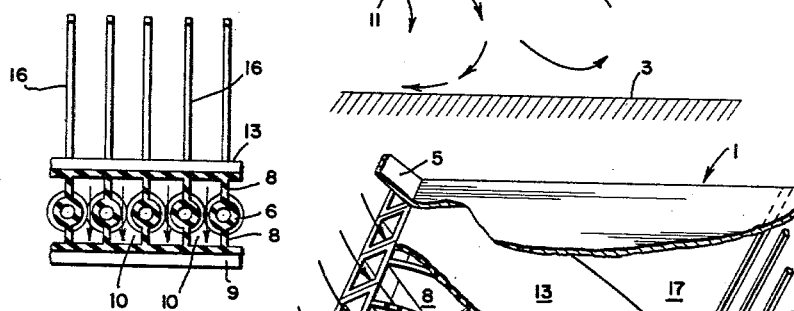
FIG. 5
FIG. 6
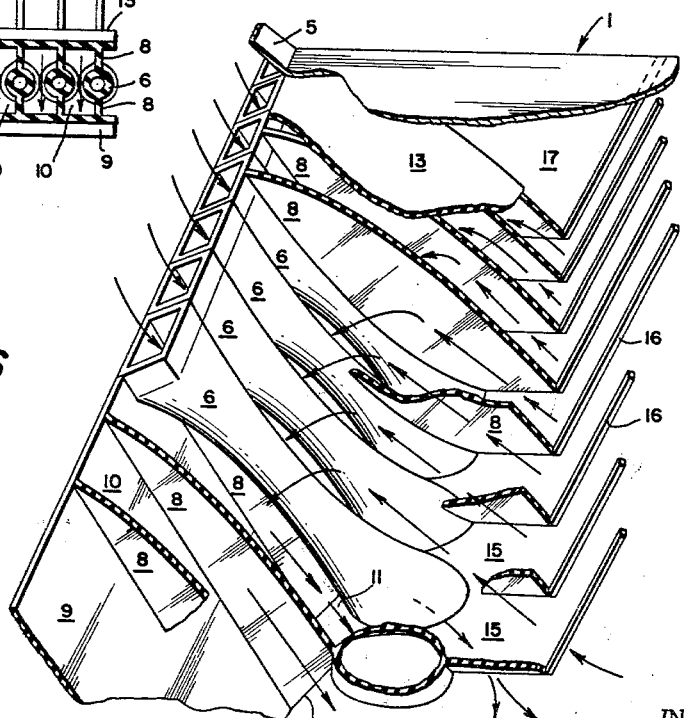
INVENTOR
RICHARD STANTON JONES
BY Larson and Taylor
ATTORNEYS United States Patent Office
3,180,443
Patented Apr. 27, 1965

3,180,443
VEHICLES
Richard Stanton Jones, Cowes, Isle of Wight, England, assignor to Westland Aircraft Limited, Yeovil, England
Filed May 14, 1962, Ser. No. 194,638
Claims priority, application Great Britain, May 16, 1961, 17,716/61
5 Claims. (Cl. 180—7)

This invention relates to machines currently referred to as "hovercraft" or "ground effect" machines but could be applicable to other types of aerial or like machines which in at least one phase of their operation are borne up by an area of relatively high pressure air, i.e. air which is of a higher pressure than ambient air entrapped beneath the vehicle.

More particularly the invention is a development of the invention disclosed in application Serial No. 181,758 in which the jets used on a ground effect machine to generate the pressurised ground effect air cushion are extended below the platform structure as described in British Patent 860,781 in the form of a flexible skirting at the bottom edge of which jet discharge orifices are located.

One of the problems encountered in the design of ground effect machines, arises from the fact that such machines are more efficiently operated as close to the ground or water as possible but in doing so their sphere of operation is limited to very flat land or very calm water. It is, therefore, highly desirable that at least the lower part of the lift ducts and other downward extending ducts of ground effect machines are made of flexible material so that the craft is less vulnerable to damage should it strike a wave or object.

Another of the problems encountered in this type of machine is the prevention of rapid escape of air used in forming the cushion beneath it so power is now wasted unnecessarily. One known method of overcoming this second problem is to recirculate a proportion of the air forming the jet curtain around the periphery of the vehicle.

It is with the above problems in mind that the following invention has been evolved and the arrangement increases the wave operating and obstacle clearance heights obtained for a given weight output and reduces vulnerability of a rigid base platform structure to impact damage. The development which constitutes the present invention resides in improving flexible jet skirting to retard the escape of pressurised air from the cushion area at the clearance gap between the skirting and the operating surface in order to reduce still further the power requirements.

According to the present development, flexible skirting forming the inner and outer walls of a downward jet duct extension to a rigid base platform structure of a ground effect machine incorporates recirculation air or gas passages through which air or gas is recirculated from the extremity of the cushion area to the remote atmospheric side thereof to discharge downwardly in the proximity of the pressure jet discharge orifices located at the bottom of the skirtings. By this arrangement the effects of pressurisation within the cushion area and the injector action of the pressure jet system causes air recirculation between the jets and the cushion area through the skirting which causes the formation of air or gas vortices adjacent the bottom of the skirting. These further retard escape of the cushion pressure air or gas by turbulence at the outer or both sides of the pressure jet or gas curtain between the bottom of the skirting and the surface over which the machine is operating. This conserves the power output to operate the machine by the order of an estimated 10%. For efficient practical operation the cross sectional areas of the pressure jet orifices, recirculation inlets and outlets should be substantially equal, but it will be appreciated that the system will operate at some degree of efficiency where there are variations in the orifice size provided that these are not too great.

In the preferred construction the pressure jets are constituted on a side-by-side assembly of waisted flexible tubes arranged so that the adjacent waists of adjacent tubes form gaps which can be used as the cross-over and/or inlet ports for the recirculated air or gas from one side of the skirting to the other.

Two embodiments of this development will now be described, by way of example only, with reference to the accompanying drawings in which:

FIGURE 4 is a diagram similar to FIGURE 1, but shows a modification, whilst;

FIGURE 5 is a section on the line V—V of FIGURE 4, whilst;

FIGURE 6 is a perspective view showing the arrangement of the recirculation ducts with skirts as shown in FIGURE 4.

Figure 1:
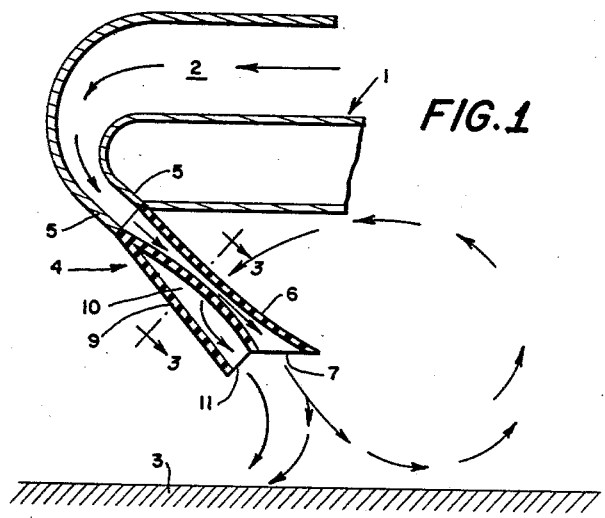
FIGURE 1 is an elevation in section through the base platform, ducting and flexible jet skirting of a peripheral jet type ground effect machine, whilst.
Figure 2:
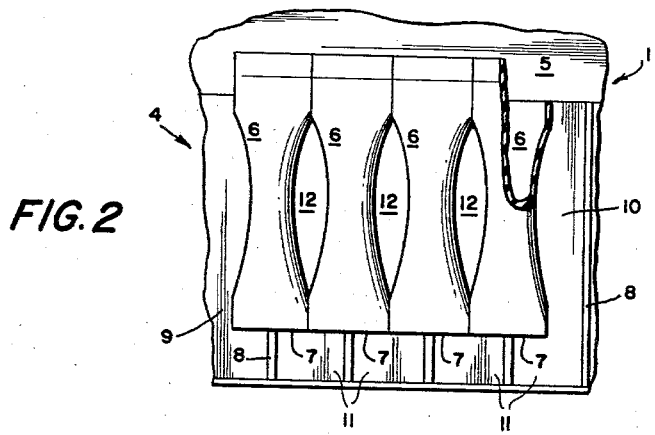
FIGURE 2 is an elevation of part of the flexible skirting viewed from the inside, i.e. looking outwardly from within the ground effect cushion area.
Figure 3:
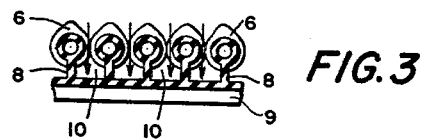
FIGURE 3 is a section on the lines III—III of FIGURE 1.

Referring to FIGURES 1 to 3, the rigid base platform 1 of a peripheral jet type ground effect machine carries a rigid air supply duct 2 around the periphery. The duct 2 conveys air, drawn from atmosphere, to peripheral pressure jets 7 through which the air is discharged downwardly. The air is pressurised within the duct 2 by one or more centrifugal fans, not shown. The pressure air discharge from the jets 7 generates the ground effect pressurised air cushion between the surface 3, over which the machine is operating, and the base platform 1.

The duct 2 is flexibly extended a predetermined distance beneath the platform 1 by a flexible skirting generally indicated at 4, the flexible skirting 4 being attached to the rigid walls 5 of the duct 2 by one of the methods described in co-pending application Serial No. 212,759. It is made of rubber, plastic, rubberised or plasticised fabric, or of any other like suitable flexible material giving a strength as described in co-pending application Serial No. 251,340. The distance the skirting 4 extends the duct 2 below the platform 1 is decided in accordance with co-pending application Serial Nos. 251,342, now abandoned and 251,341. The dimensions and relative positioning of the inner and outer walls of the jets 7 and any desired internal rigidity or separating diaphragms are constructed according to application Serial No. 181,758.

The flexible skirting 4 incorporates a side-by-side assembly of waisted flexible tubes 6 through which the pressurised air is discharged through the jets 7 formed by the downward free ends of the tubes 6.

By means of cross-diaphragms 8 (FIGURE 3) between the tube assembly 6 and the outer edge 9 of the skirting 4, a series of air passages 10, terminating with discharge ports 11, are formed. As shown in FIGURE 2, the waisting of adjacent pressure jet tubes 6 form inlet ports 12, located on the inner or air cushion side of the skirting 4, to the outer passages 10. The passages 10 constitute air recirculation passages. Air can, therefore, pass from the cushion or pressure side of the skirting 4, at the extremities of the cushion area, through the inlet ports 12 to the remote or atmospheric side of the skirting 4, via the passages 10 and discharge ports 11 in the proximity of the jets 7.

In the modification illustrated in FIGURES 4 and 5, the pressure jet tubes 6 are centrally located within the skirting 4 whilst the cross-diaphragms 8 are extended on both sides of the tube assembly 6. The skirting 4 is then provided with an additional inner wall 13 so that the ports 12 become cross-over ports from the inner or cushion side of the skirting to the outer or atmospheric side thereof. Inner downward extensions 14 are thus provided for the recirculation passages 10 with air inlet ports 15 again situated at the extremities of the cushion area, but located at the bottom of the skirting 4.

Peripheral ties 16 are provided for positioning the jet angle as desired, and the angle is selected in accordance with co-pending application Serial No. 181,758. The ties, or a tie diaphragm in lieu, are constructed or vented to allow build-up of cushion pressure in, and drainage of water from, the space or spaces 17 between the ties or diaphragms and the skirting 4.

In operation of the invention, upon the centrifugal fans (not shown) of the machine being started, air is pumped under pressure around the peripheral duct system 2 and will be downwardly discharged from the tubes 6 and jets 7 flexibly extending the solid walls 5 or the peripheral ducts 2. Once the "air cushion" has been established beneath the base platform 1 the jet stream or continuous downwardly moving "curtain" which both generates, maintains and contains the pressurised "air cushion" beneath the machine will be affected in two ways. Firstly as it strikes the ground or water 3 at a predetermined angle, some of the air stream will be bent outwards relatively to the machine under pressure from the "air cushion" whilst some will be turned back upon itself underneath the machine to form loops or vortices. The radius of the loops or vortices is such that the air which has reached the top of said loops will be confronted with the inlet ports 12 (FIGURE 1) or 15 (FIGURE 4) and will be able to pass through to the recirculation passages 10. The air has then only one exit, that being downwards to exhaust in the proximity of the main jets 7 through the recirculation passage outlets 11 thereby forming a secondary jet "curtain." The effect of the main jet "curtain" upon that of the secondary recirculation jet "curtain" from the outlets 11 is to act as an injector thereby substantially assisting the induction of the vortex air into the recirculation passage inlets 12 or 15.

It will be appreciated by those skilled in the art that the loops or vortices of air created around the periphery of the machine are mainly outside the rigid base platform structure thereof and the recirculation system is therefore sometimes referred to as "open loop recirculation."

The loops or vortices, owing to their turbulant effect, form an additional barrier to the "air cushion" and when it finally issues as a secondary jet "curtain" from the recirculation ducts, considerable amounts of power are saved.

In the modified form of the invention shown in FIGURE 4, the loops or vortices are formed at the end of the flexible skirting, as the recirculating air can only enter the recirculation passages at the level of the main jets 7. The loops are, therefore, of considerably smaller radius and when finally issuing from the recirculation outlets 11 have virtually created a third barrier to the escape of the air cushion.

It will be appreciated that apart from the recirculation in passages, no gaps exist through the skirting between atmosphere and the air cushion.

However, when the machine strikes waves or other objects, the flexible skirting will collapse locally and then returns to the normal position under the influence of the pressurised air passing therethrough.

It will also be appreciated that when made in sections, the flexible skirting is easily fitted and sectionally replaced should wear through pitting by spray, dust, or abrasion occur.

The general arrangement as shown in the modification according to FIGURE 4 is shown for the sake of clarity in FIGURE 6 which illustrates a perspective view of skirting as applied to a ground effect machine incorporating recirculation ducts.

I claim as my invention:

1. In a ground effect machine of the type which is supported on at least one cushion of pressurized fluid, the machine having a substantially rigid base platform structure, the at least one cushion of pressurized fluid being generated between the rigid base platform structure and the surface over which the machine is operating, the improvement comprising: means for forming and maintaining said at least one air cushion, said means comprising flexible skirting extending below and continuously around the periphery of said base platform structure and having a side-by-side assembly of waisted flexible tubes forming pressure jet orifices opening at substantially the lower terminal edge of said flexible skirting, and recirculation ducts formed by said flexible skirting and said waisted tubes for recirculating a portion of the gas which issues from said orifices and discharging the recirculated gas downwardly in the vicinity of said pressure jet orifices on the sides of said pressure jet orifices which face outwardly from the machine, said recirculation ducts having their inlets formed between the waisted portions of adjacent tubes and disposed inwardly of said pressure jet orifices and having their outlets disposed outwardly of said pressure jet orifices relative to the machine, said outlets being disposed substantially continuously around said flexible skirting adjacent to said pressure jet orifices.

2. Apparatus as set forth in claim 1 wherein the transverse cross-sectional areas of said pressure jet orifices, said recirculation duct inlets, and said recirculation duct outlets are substantially equal.

3. In a ground effect machine of the peripheral jet type having pressure duct outlets extending substantially continuously around a periphery, means for forming and maintaining a pressure cushion, comprising: a flexible skirting extending downward from and continuously around the outer edge of said pressure duct outlets; a substantially continuously adjacent series of flexible tube-like passages communicating at their upper ends with said pressure duct outlets and terminating at their lower ends in a substantially continuously adjacent series of pressure jet orifices adjacent the lower edge of said flexible skirting; flexible wall-like means extending along at least a portion of the length of said tube-like passages and connecting said tube-like passages along said portion to said flexible skirting so as to form recirculation passages defined by said wall-like means, said flexible skirting and said tube-like passages; said recirculation passages terminating in discharge orifices defined by the lower edge of said flexible skirting, the lower edges of said wall-like means, and the edges of said pressure jet orifices; and inlet openings for said recirculation passages defined by the walls of adjacent tube-like passages over intermediate portions of said tube-like passages, whereby fluid discharged from said pressure jet orifices is recirculated through said recirculation passages to assist in maintaining a gas cushion inside said flexible skirt under said machine, said series of flexible tube-like passages comprising a plurality of individual waisted tube members joined to adjacent tubes at their upper and lower ends and joined to said flexible skirting in the vicinity of their upper ends, said inlet openings for said recirculation passages being defined by the waisted portions of adjacent tube members.

4. Apparatus as set forth in claim 3 further comprising: a second flexible skirting extending downwardly from and continuously around the inner edge of said pressure duct outlets; additional flexible wall-like means extending along at least a portion of the length of said tube-like passages and connecting said tube-like passages along said portion to said second flexible skirting on the side of said tube-like passages remote from said firstmentioned flexible skirting so as to form extension passages communicating at their upper ends with said inlet openings for said recirculation passages and terminating at their lower ends in inlet orifices defined by the lower edge of said second flexible skirting, the lower edges of said additional flexible wall-like means, and the edges of said pressure jet orifices.

5. Apparatus as set forth in claim 3 wherein said pressure jet orifices, said discharge orifices, and said inlet openings are substantially equal in transverse cross-sectional area.

References Cited by the Examiner
FOREIGN PATENTS

| | | |
|---|---|---|
| 1,238,499 | 7/60 | France. |
| 1,240,721 | 8/60 | France. |
| 860,781 | 2/61 | Great Britain. |
| 137,405 | 4/61 | Russia. |

A. HARRY LEVY, *Primary Examiner.*

PHILIP ARNOLD, *Examiner.*